(12) United States Patent
Tibbs et al.

(10) Patent No.: US 10,807,108 B2
(45) Date of Patent: Oct. 20, 2020

(54) FLUID SPRAY INJECTORS

(71) Applicant: Delavan Inc, West Des Moines, IA (US)

(72) Inventors: Andy W. Tibbs, Earlham, IA (US); Philip E. O. Buelow, West Des Moines, IA (US)

(73) Assignee: DELAVAN INC., West Des Moines, IA (US)

( * ) Notice: Subject to any disclaimer, the term of this patent is extended or adjusted under 35 U.S.C. 154(b) by 262 days.

(21) Appl. No.: 15/653,931

(22) Filed: Jul. 19, 2017

(65) Prior Publication Data
US 2019/0022673 A1    Jan. 24, 2019

(51) Int. Cl.
| B05B 1/34 | (2006.01) |
| F01N 3/20 | (2006.01) |
| F02M 61/16 | (2006.01) |
| F02M 61/18 | (2006.01) |
| B05B 15/20 | (2018.01) |
| B05B 1/06 | (2006.01) |

(52) U.S. Cl.
CPC .............. *B05B 1/3415* (2013.01); *B05B 1/06* (2013.01); *B05B 1/3494* (2013.01); *B05B 15/20* (2018.02); *F01N 3/2066* (2013.01); *F02M 61/162* (2013.01); *F02M 61/1853* (2013.01); *F01N 2610/1453* (2013.01)

(58) Field of Classification Search
CPC ......... B05B 1/3415; B05B 15/20; B05B 1/06; B05B 1/3494; F01N 3/2066; F01N 2610/1453; F02M 61/162; F02M 61/1853

USPC ................................. 239/463, 468, 492, 583
See application file for complete search history.

(56) References Cited

U.S. PATENT DOCUMENTS

| 2,037,645 | A | * | 4/1936 | Vroom | F23D 11/28 |
| | | | | | 239/492 |
| 3,100,084 | A | * | 8/1963 | Biber | B05B 1/3431 |
| | | | | | 239/463 |
| 4,087,050 | A | | 5/1978 | Tsuji et al. | |
| 6,024,301 | A | | 2/2000 | Hurley et al. | |
| 2007/0241210 | A1 | | 10/2007 | Schindler et al. | |
| 2011/0126529 | A1 | | 6/2011 | Park et al. | |

OTHER PUBLICATIONS

Extended European Search Report of the European Patent Office, dated Sep. 13, 2018, in corresponding European Patent Application No. 18181620.8.

* cited by examiner

*Primary Examiner* — Steven J Ganey
(74) *Attorney, Agent, or Firm* — Locke Lord LLP; Daniel J. Fiorello; Scott D. Wofsy

(57) ABSTRACT

A fluid spray nozzle tip can include a feed hole body that defines at least one feed hole and a spray outlet, the at least one feed hole being in direct fluid communication with the spray outlet without also being in fluid communication with an upstream spin chamber. The at least one feed hole can be a plurality of feed holes, wherein the tip further includes a pintle sealing surface body extending from the feed hole body and configured to allow a pintle to seal against a sealing surface thereof.

20 Claims, 4 Drawing Sheets

FLUID SPRAY INJECTORS

BACKGROUND

1. Field

The present disclosure relates to fluid spray injectors, e.g., for selective catalyst reduction systems that inject urea/diesel exhaust fluid for use with diesel or other suitable engines.

2. Description of Related Art

Certain selective catalyst reduction (SCR) systems (e.g., for NOx reduction) require a controlled injection of diesel exhaust fluid (DEF) or urea into the exhaust system. This fluid needs to evaporate and mix rapidly before entering a catalyst. The injectors that are used for this injection are run on a duty-cycle to control the amount of DEF in the exhaust and are operated very frequently with short cycles. However, typical pressure-swirl atomizers require a refractory period of time before the full spray cone develops, resulting in good atomization. During this refractory period the liquid effluent is temporarily very poorly atomized.

With a constant "on/off" cycle, much of the liquid injected is poorly atomized. If the spray takes a relatively long time to develop, then a significant portion of the duty-cycle could be spent developing the spray, resulting in slugs of fluid (or large droplets) being formed each cycle. Thus, these systems can suffer from unevaporated DEF depositing on the catalyst or other parts of the system resulting in fouling of the catalyst by formation of urea crystals.

Such conventional methods and systems have generally been considered satisfactory for their intended purpose. However, there is still a need in the art for improved injectors with rapid spray development. The present disclosure provides a solution for this need.

SUMMARY

In certain embodiments, a fluid spray nozzle tip can include a feed hole body that defines at least one feed hole and a spray outlet, the at least one feed hole being in direct fluid communication with the spray outlet without also being in fluid communication with an upstream spin chamber. The at least one feed hole can be a plurality of feed holes, wherein the tip further includes a pintle sealing surface body extending from the feed hole body and configured to allow a pintle to seal against a sealing surface thereof.

The spray outlet can have a constant cross sectional area over a full longitudinal dimension of the spray outlet. The spray outlet can be cylindrical.

The spray outlet can be defined through pintle sealing surface body and partly into the feed hole body. The feed holes can be defined at a non-normal angle relative to a centerline axis (forward or backward in a longitudinal direction of the centerline) of the nozzle tip where the at least one feed hole intersects with the spray outlet. The feed holes can be at normal angle relative to a centerline axis to meet the spray outlet. The feed holes can be straight.

The feed holes can be offset from centerline of the spray outlet to cause swirling in spray outlet. Each feed hole can intersect at least one other feed hole in addition to intersecting with the spray outlet.

Each feed hole can define a feed hole axis and the spray outlet defines a spray outlet axis, wherein the feed hole axis is skewed relative to the spray outlet axis.

The pintle sealing surface body can define a flange having a larger dimension from the centerline than the feed hole body. The spray outlet can effuse from the pintle sealing surface body.

The feed holes can be recessed inwardly from the sealing surface such that the sealing surface extends at least partially over the feed holes. The feed holes can have a non-linear shape. The non-linear shape can be a tentacle shaped.

The feed hole body can be integral with the pintle sealing surface body. The feed hole body can be shaped to be surrounded by a pintle to allow the pintle to seal against the pintle sealing surface to prevent flow to the feed holes. The sealing surface body can include a cavity configured to receive a pintle to allow the pintle to interact with the pintle sealing surface to prevent flow to the feed holes.

In accordance with at least one aspect of this disclosure, a fluid spray nozzle tip can include a feed hole body that defines a plurality of feed holes and a pintle sealing surface body extending from the feed hole body and configured to allow a pintle to seal against a sealing surface thereof. At least one of the feed hole body and the pintle sealing surface body define a spray outlet in direct fluid communication with the plurality of feed holes without an upstream spin chamber.

The spray outlet can have a constant flow area. For example, the spray outlet can be cylindrical. Any other suitable shape for the spray outlet is contemplated herein.

In certain embodiments, the spray outlet can be defined through pintle sealing surface body and partly into the feed hole body. The feed holes can be defined at a non-normal angle relative to centerline axis of the nozzle tip to meet the spray outlet. In certain embodiments, the feed holes can be defined at normal angle relative to centerline axis to meet the spray outlet.

In certain embodiments, the feed holes can be straight. Any other suitable shape (e.g., a non-linear flow channel) is contemplated herein. The feed holes can be offset from centerline to cause swirling in spray outlet.

The pintle sealing surface body can define a flange having a larger dimension from the centerline than the feed hole body. The spray outlet can spray from the pintle sealing surface body.

In certain embodiments, the feed holes can be recessed from sealing surface such that sealing surface extends over the feed holes. In certain embodiments, the feed holes have tentacle shape, however, any suitably shaped flow channels are contemplated herein.

In certain embodiments, the feed hole body can be integral with the pintle sealing surface body. It is contemplated that the feed hole body and the pintle sealing surface body can be separate pieces joined together in any suitable manner.

The feed hole body can be shaped to be surrounded by a pintle to allow the pintle to interact with the pintle sealing surface to prevent flow to the feed holes. In certain embodiments, the sealing surface body can include a cavity configured to receive a pintle to allow the pintle to interact with the pintle sealing surface to prevent flow to the feed holes.

In accordance with at least one aspect of this disclosure, a fluid spray nozzle includes a housing defining a flow cavity, any suitable embodiment of a nozzle tip as described above and disposed at an end of the housing, and a pintle disposed within the flow cavity and configured to axially actuate therein between an open position where the feed holes are in fluid communication with the flow cavity, and a closed position where the pintle interacts with the pintle sealing surface to seal the feed holes from the flow cavity. The nozzle tip can be integral with the housing in certain embodiments.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
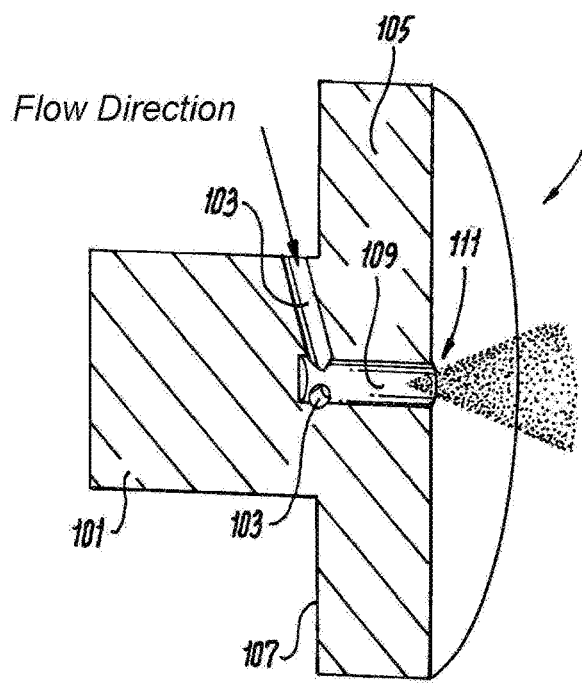
FIG. 1A is a cross-sectional perspective view of an embodiment of a nozzle tip in accordance with this disclosure.

Reference will now be made to the drawings wherein like reference numerals identify similar structural features or aspects of the subject disclosure. For purposes of explanation and illustration, and not limitation, an illustrative view of an embodiment of a nozzle tip in accordance with the disclosure is shown in FIG. 1A and is designated generally by reference character 100. Other embodiments and/or aspects of this disclosure are shown in FIGS. 1B-5. The systems and methods described herein can be used to reduce time to develop atomized spray and to simplify nozzle assemblies.

Figure 1B:
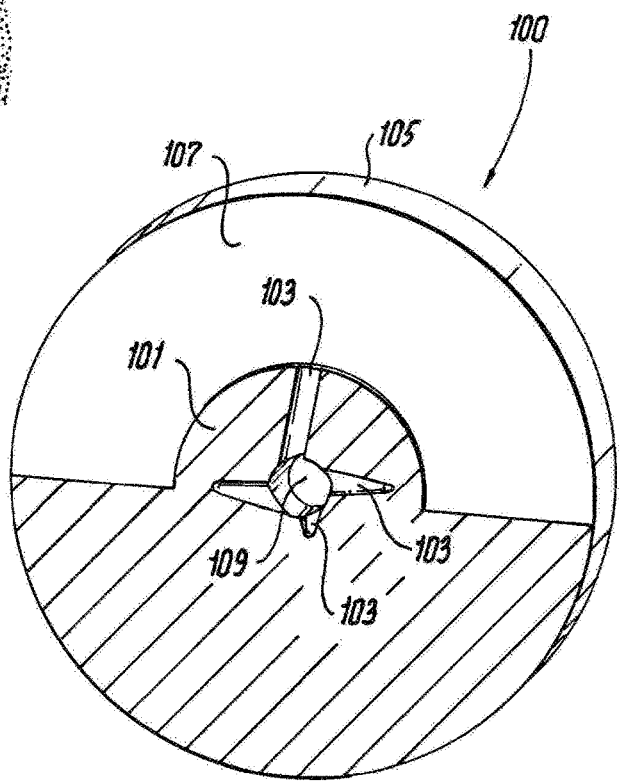
FIG. 1B is a cross-sectional perspective view of the embodiment of FIG. 1A.
Figure 1C:
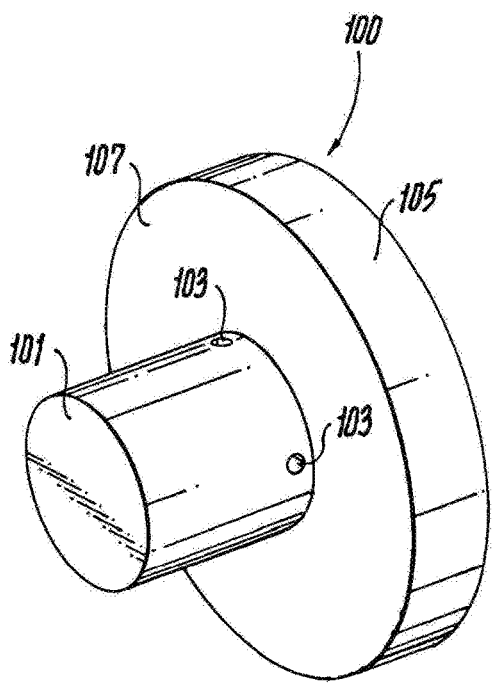
FIG. 1C is a perspective view of the embodiment of FIG. 1A.
Figure 2A:
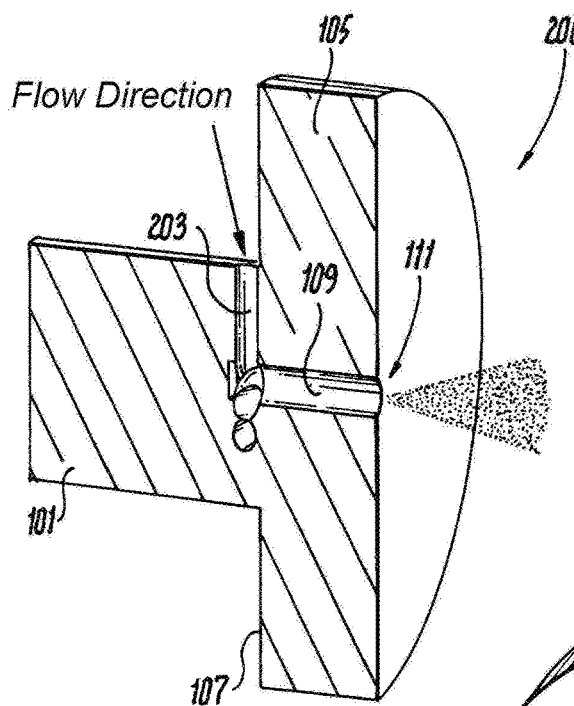
FIG. 2A is a cross-sectional perspective view of an embodiment of a nozzle tip in accordance with this disclosure, shown including more feed holes than the embodiment of FIG. 1A.
Figure 2B:
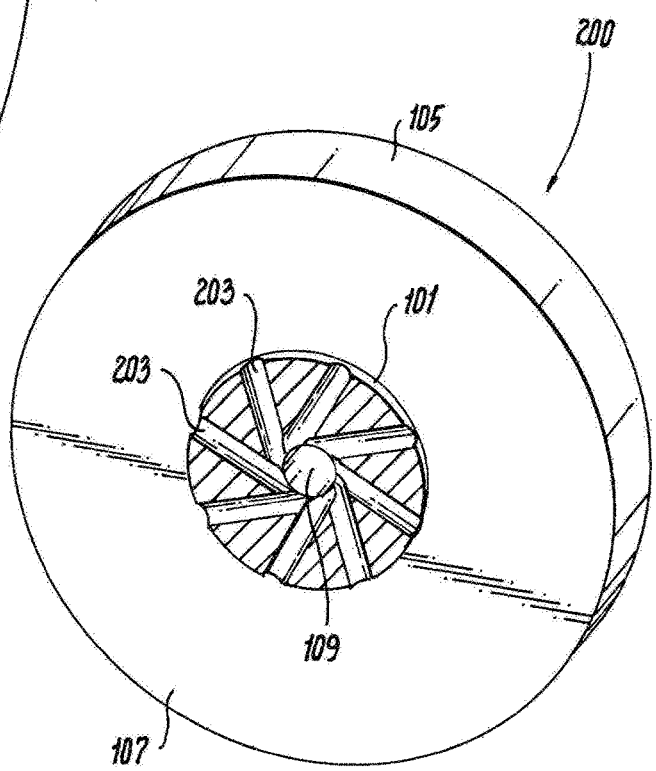
FIG. 2B is a cross-sectional perspective view of the embodiment of FIG. 2A.
Figure 2C:
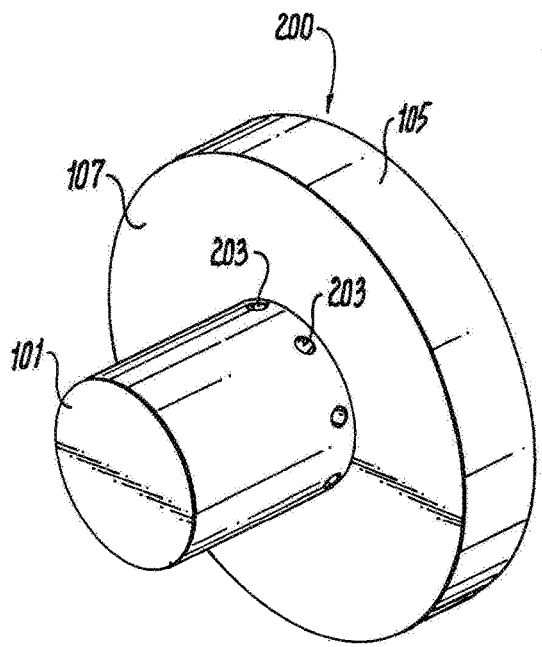
FIG. 2C is a perspective view of the embodiment of FIG. 2A.
Figure 3A:
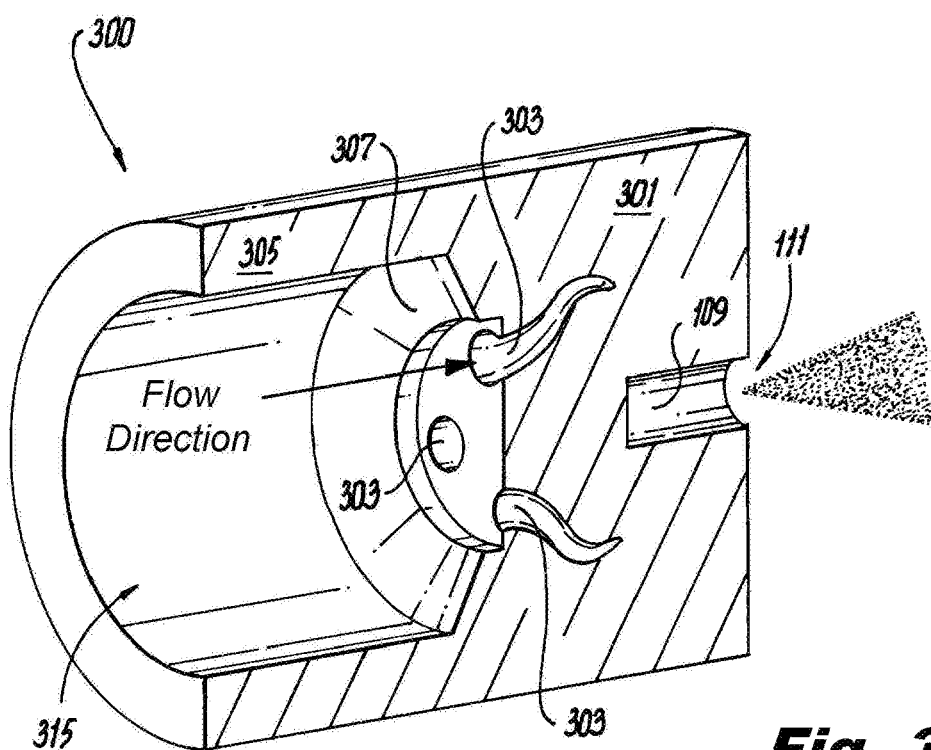
FIG. 3A is a cross-sectional perspective view of an embodiment of a nozzle tip in accordance with this disclosure.
Figure 3B:
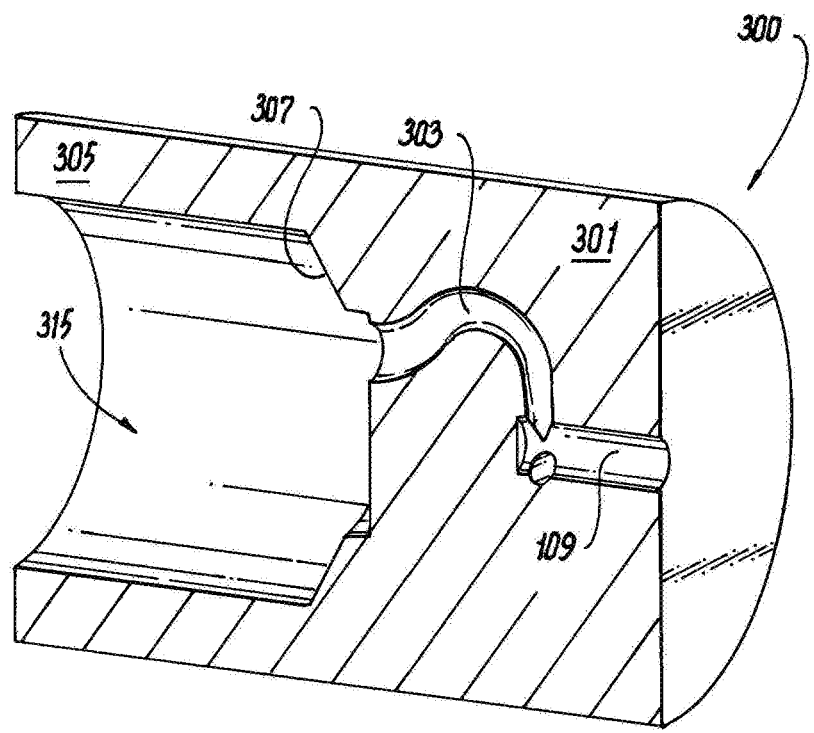
FIG. 3B is a cross-sectional perspective view of the embodiment of FIG. 3A.
Figure 4:
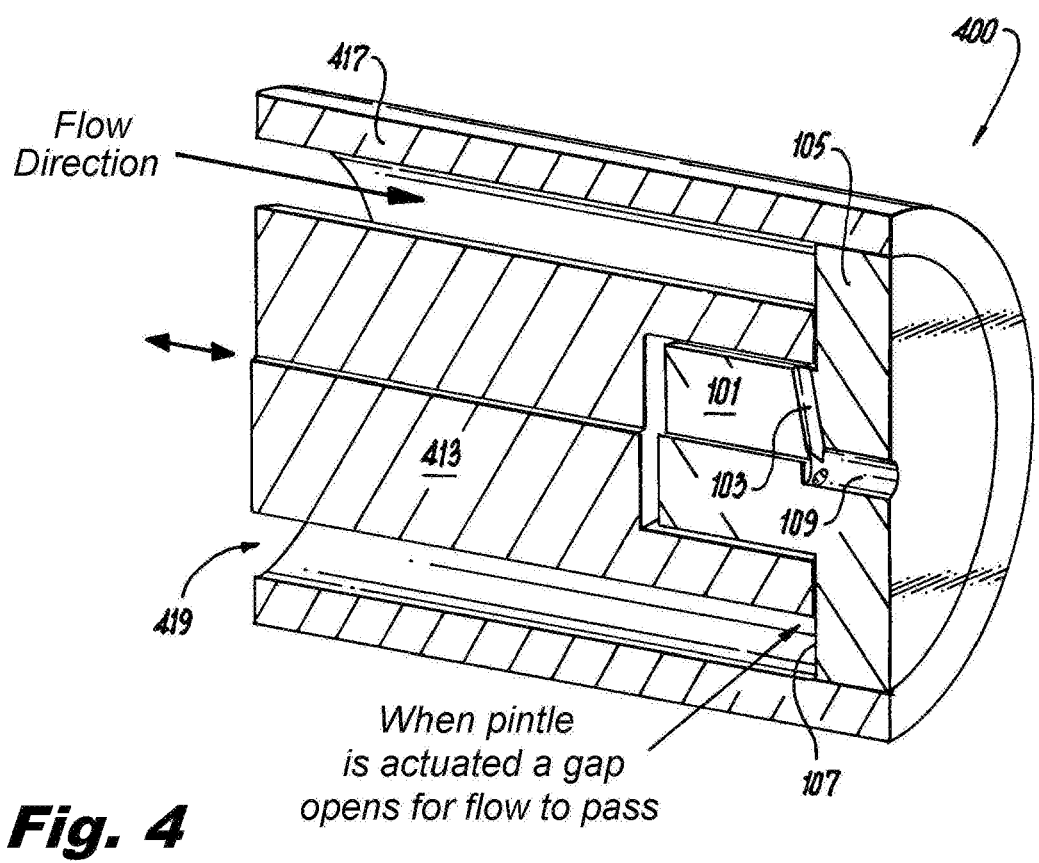
FIG. 4 is a cross-sectional perspective view of an embodiment of a fluid spray nozzle in accordance with this disclosure.

Referring to FIGS. 1A-1C, a fluid spray nozzle tip 100 includes a feed hole body 101 that defines one or more of feed holes 103 and a pintle sealing surface body 105 extending from the feed hole body 101 and configured to allow a pintle (e.g., as shown in FIGS. 4 and/or 5) to seal against a sealing surface 107 thereof. At least one of the feed hole body 101 and the pintle sealing surface body 105 define a spray outlet 109 in direct fluid communication with the plurality of feed holes 103 without an upstream spin chamber (e.g., a spin chamber between the feed holes 103 and the spray outlet 109 that is normally included in traditional systems). A spin chamber is traditionally placed before the outlet to induce swirl in the flow before it enters the outlet and has a different diameter than the outlet (e.g., a larger diameter) and feeds into the outlet.

The spray outlet 109 can be centrally located (e.g., coaxial with the centerline of the tip 100) or in any other suitable position. The spray outlet 109 can include any suitable opening edge 111 (e.g., sharp to cause narrower spray angle, angled (beveled) edge for wider spray angle). The spray outlet 109 can have a constant flow area. For example, the spray outlet 109 can be cylindrical. Any other suitable shape and/or dimensions (e.g., 1 to 1 diameter to length) for the spray outlet 109 is contemplated herein.

As shown, in certain embodiments, the spray outlet 109 can be defined through pintle sealing surface body 105 and partly into the feed hole body 101. As shown in FIG. 1A, the feed holes 103 can be defined at a non-normal angle relative to centerline axis of the nozzle tip 100 to meet the spray outlet 109. Referring to FIG. 2A, in certain embodiments, the feed holes 203 of a nozzle 200 can be defined at normal angle relative to centerline axis to meet the spray outlet 109. In certain arrangements where there are a sufficiently high number of feed holes 209, to have a clean intersection (such that there are no peaks or sharp edges formed within the spray outlet 109) of the spray outlet 109, the feed holes 209 may need to be perpendicular to the centerline axis.

As shown in FIGS. 1A-2C, in certain embodiments, the feed holes 103, 203 can be straight. Any other suitable shape (e.g., a non-linear flow channel) is contemplated herein. The feed holes 103, 203 can be offset from centerline to cause swirling in spray outlet 109.

The pintle sealing surface body 105 can define a flange having a larger dimension from the centerline than the feed hole body 101. The spray outlet 109 can spray from the pintle sealing surface body 105 as shown in FIGS. 1A and 2A, or from any other suitable location.

Referring now to FIGS. 3A and 3B, in certain embodiments, a nozzle 300 can include feed holes 303 that are recessed from sealing surface 307 such that sealing surface 307 extends over the feed holes 303. As shown, the sealing surface 307 can be angled instead of flat. Any suitable shape of the sealing surface 107, 307 is contemplated herein.

In certain embodiments, the feed holes 303 have a non-linear shape (e.g., tentacle shape with curves in one or more dimensions), however, any suitably shaped flow channels are contemplated herein. The feed holes 303 can meet the outlet 109 offset from the centerline to cause swirling in the outlet 109 and/or can be meet at a normal angle or at any suitable tilt angle.

Referring to FIGS. 1A-3B, in certain embodiments, the feed hole body 101, 301 can be integral with the pintle sealing surface body 105, 305 (e.g., additively manufactured, casted). It is contemplated that the feed hole body 101, 301 and the pintle sealing surface body 105, 305 can be separate pieces joined together in any suitable manner (e.g., via welding, via adhesion).

As shown in FIGS. 1A-2C and FIG. 4, the feed hole body 101 can be shaped to be surrounded by a pintle 413 to allow the pintle 413 to interact with the pintle sealing surface 107 to prevent flow to the feed holes 103, 203. In certain embodiments, referring to FIGS. 3A, 3B, and FIG. 5, the sealing surface body 105 can include a cavity 315 configured to receive a pintle 513 to allow the pintle 513 to interact with the pintle sealing surface 307 to prevent flow to the feed holes 303.

In accordance with at least one aspect of this disclosure, referring to FIG. 4, a fluid spray nozzle 400 includes a housing 417 defining a flow cavity 419. Any suitable embodiment of a nozzle tip (e.g., tip 100, 200) as described above can be disposed at an end of the housing 417. A pintle 413 is disposed within the flow cavity 419 and is configured to axially actuate therein between an open position where the feed holes 103 are in fluid communication with the flow cavity 419 and a closed position (e.g., as shown in FIG. 4) where the pintle 413 interacts with the pintle sealing surface 107 to seal the feed holes 103 from the flow cavity 419.

Figure 5:
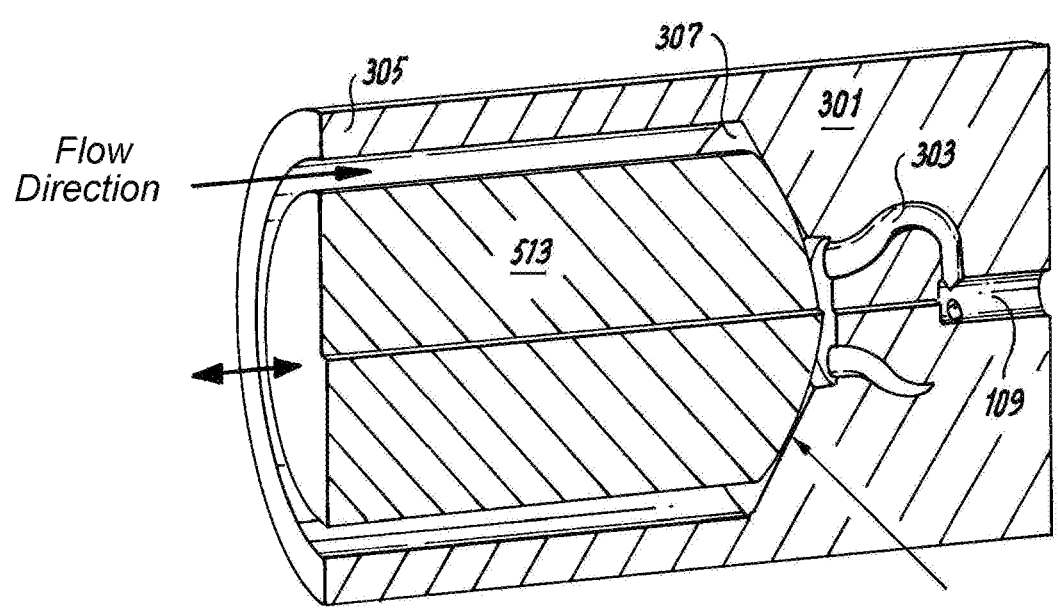
FIG. 5 is a cross-sectional perspective view of an embodiment of a fluid spray nozzle in accordance with this disclosure.

In certain embodiments, the nozzle tip 103 can be integral with the housing 417. For example, FIG. 5 shows the nozzle tip 300 of FIGS. 3A and 3B where the sealing surface body 305 defines a cavity 315 that can receive a pintle 513.

As described above, feed holes directly intersect the spray orifice at the upstream end, without a spin-chamber, which allows rapid development of a swirling flow-field and a corresponding conical spray. Feed holes offset from the centerline can create spin for atomizing quickly. Embodiments include a single piece structure that has a single orifice that causes swirling and spraying. Certain embodiments can be additively manufactured which can allow for any suitable structures and flow channels.

Certain embodiments provide a means to very rapidly form a fully-developed conical spray. This can be particularly advantageous in applications where the injector (spray) is duty-cycled on and off, frequently (e.g., in SCR NOx reduction systems). Typical pressure-swirl atomizers have offset holes/slots which feed an upstream spin-chamber to establish a swirling flow-field, which then passes through a smaller diameter orifice and forms a finely atomized conical spray. Filling this spin-chamber and establishing the swirling flow-field takes time, and during this time the spray may or may not be conical and is typically very poorly atomized. Embodiments eliminate the spin-chamber and feed offset holes/slots directly into the orifice. This permits very rapid spray cone development with good atomization. Embodiments can be used as swirler for any suitable system and is not limited to use in SCR systems, or even for rapid spray development.

The methods and systems of the present disclosure, as described above and shown in the drawings, provide for spray nozzles with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fluid spray nozzle tip, comprising:
a feed hole body that defines at least one feed hole and a spray outlet, the at least one feed hole being in direct fluid communication with the spray outlet without an upstream spin chamber, wherein the at least one feed hole is a plurality of feed holes, wherein the tip further includes a pintle sealing surface body extending from the feed hole body and configured to allow a pintle to seal against a sealing surface thereof.

2. The nozzle tip of claim 1, wherein the spray outlet has a constant cross sectional area over a full longitudinal dimension of the spray outlet.

3. The nozzle tip of claim 2, wherein the spray outlet is cylindrical.

4. The nozzle tip of claim 1, wherein the spray outlet is defined through pintle sealing surface body and partly into the feed hole body.

5. The nozzle tip of claim 1, wherein the feed holes are defined at a non-normal angle relative to a centerline axis of the nozzle tip where the at least one feed hole intersects with the spray outlet.

6. The nozzle tip of claim 1, wherein the feed holes are at normal angle relative to a centerline axis to meet the spray outlet.

7. The nozzle tip of claim 1, wherein the feed holes are straight.

8. The nozzle tip of claim 1, wherein the feed holes are offset from centerline of the spray outlet to cause swirling in spray outlet.

9. The nozzle tip of claim 8, wherein each feed hole intersects at least one other feed hole in addition to intersecting with the spray outlet.

10. The nozzle tip of claim 8, wherein the each feed hole defines a feed hole axis and the spray outlet defines a spray outlet axis, wherein the feed hole axis is skewed relative to the spray outlet axis.

11. The nozzle tip of claim 1, wherein the pintle sealing surface body defines a flange having a larger dimension from the centerline than the feed hole body.

12. The nozzle tip of claim 11, wherein the spray outlet effuses from the pintle sealing surface body.

13. The nozzle tip of claim 1, wherein the feed holes are recessed inwardly from the sealing surface such that the sealing surface extends at least partially over the feed holes.

14. The nozzle tip of claim 13, wherein the feed holes have a non-linear shape.

15. The nozzle tip of claim 14, wherein the non-linear shape is tentacle shaped.

16. The nozzle tip of claim 1, wherein the feed hole body is integral with the pintle sealing surface body.

17. The nozzle tip of claim 16, wherein the feed hole body is shaped to be surrounded by a pintle to allow the pintle to seal against the pintle sealing surface to prevent flow to the feed holes.

18. The nozzle tip of claim 16, wherein the sealing surface body includes a cavity configured to receive a pintle to allow the pintle to interact with the pintle sealing surface to prevent flow to the feed holes.

19. A fluid spray nozzle, comprising:
a housing defining a flow cavity;
a nozzle tip disposed at an end of the housing, comprising:
a feed hole body that defines a plurality of feed holes; and
a pintle sealing surface body extending from the feed hole body and configured to allow a pintle to seal against a sealing surface thereof, and
wherein at least one of the feed hole body and the pintle sealing surface body define a spray outlet in direct fluid communication with the plurality of feed holes without an upstream spin chamber; and
a pintle disposed within the flow cavity and configured to axially actuate therein between an open position where the feed holes are in fluid communication with the flow cavity, and a closed position where the pintle interacts with the pintle sealing surface to seal the feed holes from the flow cavity.

20. A fluid spray nozzle tip, comprising:
a feed hole body that defines at least one feed hole and a spray outlet, the at least one feed hole being in direct fluid communication with the spray outlet without an upstream spin chamber, wherein the at least one feed hole is defined at a non-normal angle relative to a centerline axis of the nozzle tip where the at least one feed hole intersects with the spray outlet.

\* \* \* \* \*